(12) United States Patent
Taylor et al.

(10) Patent No.: US 12,728,359 B2
(45) Date of Patent: Sep. 8, 2026

(54) SYSTEMS AND METHODS FOR DETECTING NEGATIVE GAMEPLAY BEHAVIOR AND TOXIC GAMEPLAY CONTROL

(71) Applicant: Sony Interactive Entertainment Inc., Tokyo (JP)

(72) Inventors: Michael Taylor, San Mateo, CA (US); Coimbatore Ravi Madhavan, Sunnyvale, CA (US); Richard Olabode, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 162 days.

(21) Appl. No.: 18/456,909

(22) Filed: Aug. 28, 2023

(65) Prior Publication Data

US 2025/0073598 A1 Mar. 6, 2025

(51) Int. Cl.
*A63F 13/75* (2014.01)
*A63F 13/35* (2014.01)
*A63F 13/79* (2014.01)
*G06N 5/04* (2023.01)
*G06N 20/00* (2019.01)

(52) U.S. Cl.
CPC .............. *A63F 13/75* (2014.09); *A63F 13/79* (2014.09); *G06N 20/00* (2019.01); *A63F 13/35* (2014.09)

(58) Field of Classification Search
CPC ........ A63F 13/533; A63F 13/67; A63F 13/75; A63F 13/79; A63F 2300/5546; A63F 2300/5586; G06N 20/00; G06N 5/04
See application file for complete search history.

(56) References Cited

U.S. PATENT DOCUMENTS 11,090,566 B1 * 8/2021 Chow ..................... A63F 13/75
2019/0270021 A1 * 9/2019 Hume ..................... A63F 13/87
2021/0402304 A1 * 12/2021 Dorn ..................... A63F 13/493
2022/0032198 A1 * 2/2022 Orrino .................. A63F 13/352
2022/0032199 A1 * 2/2022 Rudi ...................... G06N 20/00
2022/0111297 A1 * 4/2022 Rudi ...................... A63F 13/79

OTHER PUBLICATIONS

International Search Report dated Nov. 27, 2024 in International Application No. PCT/IB2024/058326.
Written Opinion dated Nov. 27, 2024 in International Application No. PCT/IB2024/058326.
PCT/IB2024/058326, "International Preliminary Report on Patentability", Mar. 12, 2026, 8 pages.

* cited by examiner

*Primary Examiner* — Lawrence S Galka
(74) *Attorney, Agent, or Firm* — Kilpatrick Townsend & Stockton LLP

(57) ABSTRACT

System, process and device configurations are provided for detecting negative gameplay behavior and gameplay control. A method can include receiving gameplay data for a plurality of players for a game, wherein the gameplay data includes player input controls for the plurality of players. The process may use player input controls to detect negative gameplay behavior, such as a toxic behavior, including but not limited to a team kill, item/equipment trade fraud. Player input controls may be identified and evaluated using a model. Processes can include warning players based on patterns observed by the model and blocking toxic player input controls meant to harm other players. Processes can include determining game function responses of the game to limit outcome of the at least one player input control for the game and controlling output of the game.

19 Claims, 4 Drawing Sheets

SYSTEMS AND METHODS FOR DETECTING NEGATIVE GAMEPLAY BEHAVIOR AND TOXIC GAMEPLAY CONTROL

FIELD

The present disclosure is directed to interactive entertainment and electronic video gaming, including gaming device operations, processes, configurations, user interface control and control device configurations.

BACKGROUND

Computer and console games offer players different types of gaming experiences. Game titles can include multiple configurations including single player and multi-player formats. Game titles and systems can also provide communication functions for players. There is a desire to improve gaming experiences and offer control features with game titles including features to control negative behavior of users. In some cases, player profile information may not be enough to link or select players. In addition, some users may not be able to control game settings to their liking due to differences in personal preferences and user ability. There is a need and a desire for gaming systems and devices to provide detection of negative gameplay behavior. There is also a need and a desire for gaming systems to improve controllability of device operation.

BRIEF SUMMARY OF THE EMBODIMENTS

Disclosed and described herein are systems, methods and configurations for detecting negative gameplay behavior and gameplay control. In one embodiment, a method includes receiving, by a device, gameplay data for a plurality of players for a game, wherein the gameplay data includes player input controls for the plurality of players. The method also includes detecting, by the device, at least one negative game behavior for at least one player of the plurality of players, wherein the at least one negative game behavior is detected based on at least one player input control for a first player. The method also includes determining, by the device, at least one game function response of the game to limit outcome of the at least one player input control for the game. The method also includes controlling, by the device, output of the game using the at least one game function response.

In one embodiment, the player input controls include at least one of a game controller input, voice command, audio input, text input, player in-game movement, and player position in game.

In one embodiment, the negative game behavior is an in-game action of the first player for at least one of harming and disrupting a second player of the game.

In one embodiment, the negative game behavior is a communication from the first player to at least one second player of the game.

In one embodiment, the negative game behavior is detected using a model and model training on parameters for at least one of text, speech, player in-game movement, player position in-game, and game state.

In one embodiment, determining at least one game function response includes determining a warning message for output to the first player.

In one embodiment, determining at least one game function response includes determining at least one control for blocking in-game output of the player input control In one embodiment, controlling output of the game includes at least one of blocking and limiting input controls of the first player for a period of time.

In one embodiment, controlling output of the game includes at least one of slowing and modifying game player characteristics of the first player for a period of time.

In one embodiment, controlling output of the game includes removing the first player from a game session for a period of time.

Another embodiment is directed to a device configured for detecting negative gameplay behavior and gameplay control. The device includes an interface, memory storing executable instructions, and a controller coupled to the interface and memory. The controller is configured to receive gameplay data for a plurality of players for a game, wherein the gameplay data includes player input controls for the plurality of players. The controller is configured to detect at least one negative game behavior for at least one player of the plurality of players, wherein the at least one negative game behavior is detected based on at least one player input control for a first player. The controller is configured to determine at least one game function response of the game to limit outcome of the at least one player input control for the game. The controller is configured to control output of the game using the at least one game function response.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
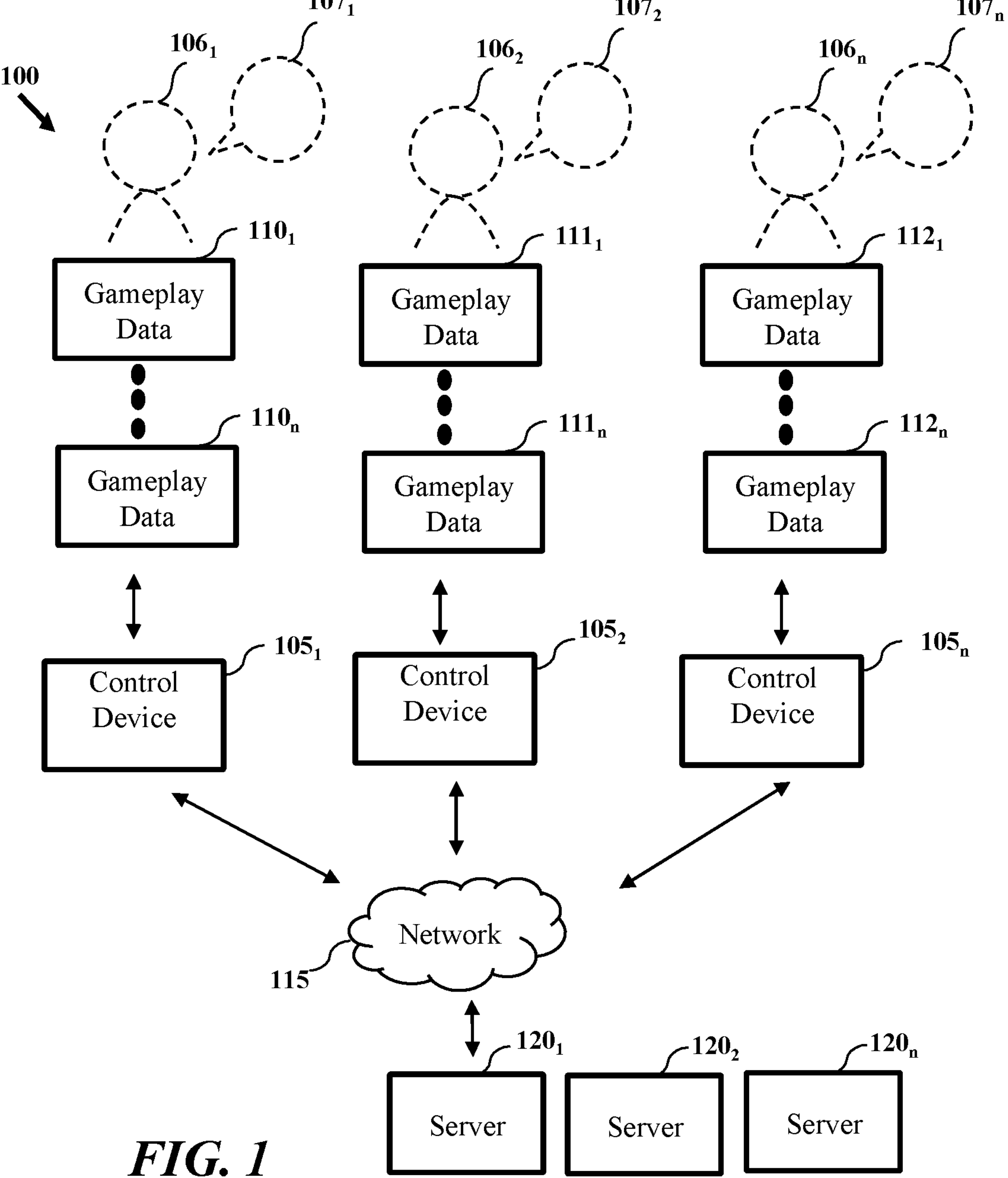
FIG. 1 is a graphical representation of a system and including devices for detecting negative gameplay behavior and gameplay control according to one or more embodiments.

One aspect of the disclosure is directed to detecting negative gameplay behavior and gameplay control. Negative gameplay behavior may occur in many forms and systems and processes are provided to detect player actions and controls that may be considered negative and/or toxic to one or more players. Control of a game may include controlling one or more game parameters of a game environment including one or more of limiting actions or functions of a player causing negative gameplay behavior, limiting the controls of one or more players, removing a player from a game and even filtering player actions from one or more game states of other players. Notifications may be generated and presented to one or more players of a multiplayer game to indicate gameplay control in response to detected gameplay behavior.

According to embodiments, processes and configurations are provided for detection and analysis of player input controls. Processes and device configurations improve operations and allow for ranges of control characteristics across one or more dimensions to provide a plurality of control options in response to detected input controls. According to embodiments, gameplay data may be received for a single player of a game, or for a plurality of players for a multiplayer game. Systems and processes are configured for detecting gameplay data including player input controls for the plurality of players. Play input controls can include game controller input, voice command, audio input, text input, player in-game movement, and player position in game. According to embodiments, player input controls may be used for training one or more models for detecting negative game behavior and control of a game. Trained models may be used for analysis by a device to control game output. Game function responses may be determined to limit or address player input controls, such as negative game behavior. In addition, output of a game may be controlled using one or more determined responses.

According to embodiments, negative game behavior may be detected for games to prevent and/or limit actions of games that may sabotage or ruin a gameplay session. Alternatively, or in combination, the negative game behavior may be detected to control or prevent one or more activities during a game session. According to embodiments, negative game behavior may include game input controls and/or user communications that include one or more of negative/offensive language, cheating, character misbehaving, anti-social actions, and lewd behavior or comments. Negative game behavior can include activities viewed as toxic for game play, including but not limited to character or multiplayer sabotage, asset wasting, mission sabotage, same-team firing, and actions in general that cause harm to other players.

According to embodiments, gameplay and game sessions for a game title may be controlled to limit or block negative game behavior. Control features can include limiting or blocking the effect of player input controls such that a games response or the ability of a player to control game play is reduced. Control features can include operations to block or limit the impact of a first player's actions on the gameplay session of other players. According to embodiments, the game session may be carried out with actions of the first player removed from the game data output to other players, removal of the first player from the session, and generating control of a replacement or computer controlled character in place of the first players controls. According to embodiments, operations and process may be performed by devices in conjunction with gameplay code and media. Game media may provide one or more game engine functions including graphics, game vectors, game story line, game levels, game characters and game elements. Processes described herein allow for modification of game parameters while retaining one or more elements of game media. In addition, processes and configurations provide a solution for identification of parameters that improve game play experience and provide user personalization. Embodiments provide processes and configurations to dynamically modify game environments and capture real time data collection.

Embodiments are directed to systems, devices and methods for game operations and controls, including operations for controlling gameplay, and analyzing user input controls during game presentation. Gaming systems may include consoles that play game media, consoles that provide network data for games, handheld devices, mobile devices (e.g., tablets, mobile phones, etc.) and devices in general configured for electronic gaming.

According to embodiments, processes and device configurations are provided including detection and processing of data using one more models, such as a machine learning (ML) model to detect player input controls of one or more users. Embodiments may include detecting input player controls to identify behavior to be controlled or limited. Detection of the input controls may be based on the controls and effects within an game environment. Embodiments, include action identification for toxic behavior moderation. Processes may include one or more machine learning models for toxic behavior identification. According to embodiments, toxic behavior identification may be based on training a multi-model toxic behavior identification system based on multiple modalities of data text, speech, player in-game movement, player position in-game. According to embodiments, toxic behavior identification may be based on a model determining a likelihood of a toxic behavior like team kill, item/equipment trade fraud and warns the players in vicinity based on patterns observed by the model. According to embodiments, toxic behavior identification may be include operations to generate warnings, such as warning players if other player actions are fraudulent or deceptive. According to embodiments, model can block toxic moves meant to harm players.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 is a graphical representation of a system and including devices for detecting negative gameplay behavior and gameplay control according to one or more embodiments. According embodiments, devices and processes are provided for detecting negative gameplay behavior and gameplay control. FIG. 1 illustrates system 100 including a plurality of control devices $\mathbf{105}_{1\text{-}n}$, network 115 and servers $\mathbf{120}_{1\text{-}n}$. According to embodiments, an electronic game can be provided to at least one player, such as users $\mathbf{106}_{1\text{-}n}$ by way of a control device, such as control devices $\mathbf{105}_{1\text{-}n}$. In embodiments, negative game behavior for a first user, such as user $\mathbf{106}_1$ may be detected and presentation of gameplay data may be controlled. For a single player game, gameplay presentation may be controlled to effect the single player. Alternatively, for a multiplayer game, such as games played with one or more players on one or more devices, presentation of the gameplay data may be controlled to effect one or more of the first player and additional players in the game session. According to embodiments, processes and operations described herein may be performed by one or more control devices 105$_{1-n}$. Alternatively or in combination, processes and operations described herein may be performed by one or more servers 110$_{1-n}$.

According to embodiments, one or more of control devices 105$_{1-n}$ and servers 120$_{1-n}$ may be configured to perform processes described herein. According to embodiments, processes and operations described herein may include one or more control devices 105$_{1-n}$ and one or more servers devices 105$_{1-n}$ receiving gameplay data for a plurality of players for a game. It should be appreciated that operations described herein with respect to multiple players or multi-player games may similarly be performed for single player games. FIG. 1 illustrates control device 105$_1$ which may be configured to received gameplay data 110$_{1-n}$ from player 106$_1$. According to embodiments, gameplay data 110$_{1-n}$ may include one or more player input controls, such as game controller input, voice command, audio input, text input, player in-game movement, and player position in game. Control device 105$_1$ may also receive player voice data 107$_1$. Similar to control device, 1051, control device 105$_2$ may be configured to received gameplay data 111$_{1-n}$ and voice data 107$_2$ from player 106$_2$ and control device 105$_n$ may be configured to received gameplay data 112$_{1-n}$ and voice data 107$_n$ from player 106$_n$. According to embodiments, at least one of control devices 105$_{1-n}$ may be configured to detect negative game behavior for at least one player. Similarly, servers 120$_{1-n}$ may be configured to detect negative game behavior for at least one player. One or more of and may be configured to control a gameplay session. As discussed herein, embodiments provide a plurality of control actions for controlling gameplay in response to detection of negative game behavior.

System 100 may provide features to improve user experience, wherein functions and operations described herein are performed following user consent, with express notice to a user, and/or in alignment with one or more user settings for user privacy. It should be appreciated that embodiments may be applied to interactive entertainment with one or more users. Processes described herein are not limited to gaming content.

Figure 2:
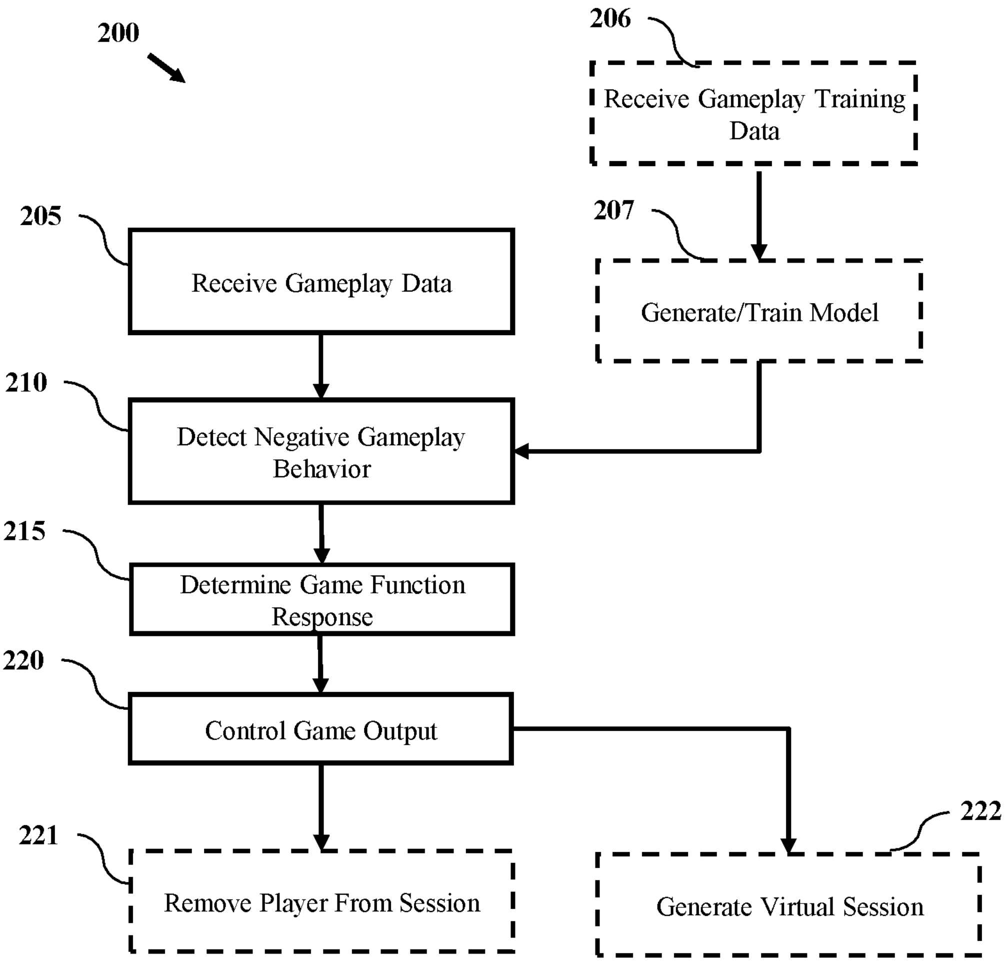
FIG. 2 illustrates a process for detecting negative gameplay behavior and gameplay control according to one or more embodiments.

FIG. 2 illustrates a process for detecting negative gameplay behavior and gameplay control according to one or more embodiments. Process 200 includes receiving gameplay data for a plurality of players for a game and controlling output of a game based on detected gameplay data. According to embodiments, controlling output pf the game can be performed to limit or reduce the effect of negative gameplay behavior, and even limit or filter unwanted behavior, such as toxic gameplay and toxic communications. Process 200 may be performed by a device, such as control devices 105$_{1-n}$ and servers 120$_{1-n}$ of FIG. 1, and device 300 and/or controller 305 of FIG. 3.

Process 200 may be initiated by a device receiving gameplay data for a plurality of players for a game at block 205. The gameplay data can include player input controls for the plurality of players. Gameplay data received at block 205 can include one or more types of data collected for a player, such as one or more of game controller input, voice command, audio input, text input, player in-game movement, and player position in game. Gameplay data may be received during a game session and detected by components of the device, such as input ports, communication interfaces, and sensors. Gameplay data my include, and/or be associated with, actions performed within a game. For a fighting game, for example, the gameplay data may include the player input controls (e.g., button presses, directional commands, etc.) and/or the related action within the game (e.g., punch, kick, throw, etc.). Similarly, for a driving game the gameplay data may include input controls (e.g., steering, button presses, etc.) and action within the game (e.g., motion of the controlled vehicle, proximity to other vehicles, etc.). For an adventure/quest game, the gameplay data may include selections of worlds, mapping data, player movement patterns within the game world. According to embodiments, gameplay data may be used to detect and control patterns of player operations.

Gameplay data may be received including player input controls for the plurality of players. Gameplay data may include data associated with a game world, such as a game vector, gaming engine state and description of gameplay within the game world or game session.

According to embodiments, a device, such as a control device or console, may detect player input controls during a gaming session. The control device may detect and/or monitor player reactions and player communications for one or more players to determine effect of player input controls. According to embodiments, detection and evaluation of player input controls may be based on a machine-learning model trained with game input controls for a game title, the gaming data for a game title and one or more user preferences. During a gaming session the player input controls may be monitored as received from control devices and one or more sensors. Patterns of user play may be used to characterize a baseline of each player, the baseline stored by a control device or server.

According to embodiments, receiving gameplay data at block 205 may optionally include receiving gaming content. For example, game data such as rendered graphics, data for rendering graphics, control data, video data, audio data, game vectors, game states, game storylines and game maps may be received for a game. Receiving game content can include receiving user permission or an indication of user permission for process 200 to operate (i.e., user opt-in).

At block 210, process 200 includes detecting at least one negative game behavior for at least one player of the plurality of players. Process 200 may detect negative game behavior to control a gameplay session. Detection and control of a game session based on negative gameplay behavior may reduce, limit and even prevent certain behavior from occurring. According to embodiments, negative game behavior may be detected based on at least one player input control for a first player. By way of example, negative game behavior can be an in-game action of the first player for at least one of harming and disrupting a second player of the game. Negative behavior may be determined based on the game type, session and/or level of skill. For a driving game, for example, operations to stall or impede a race leader to support another player may be considered a negative behavior. Alternatively, toxic behavior may be repeated attempts by a player to sabotage or impede player activities in a quest or role playing game.

According to embodiments, negative game behavior may be detected using a model and model training on parameters for at least one of text, speech, player in-game movement, player position in-game, and game state. According to embodiments, negative game behavior may include a communication from the first player to at least one second player of the game. Communication may be detected as voice or sound output of a user that is converted from audio to text.

The converted text may be detected and analyzed to determine content of the communication. Player outputs that are offensive, hostile or negative may be identified and flagged as a negative gameplay behavior. Control devices may detect toxic language, cheating, character misbehaving, anti-social messages, attempts to hoard to block asset generation, and negative content in general.

According to embodiments, process 200 can predict toxic behavior and prevent player actions. By way of example, user actions to impede a player based on the input controls and game state may indicate a pattern and be used to detect an upcoming game event with a high probability. Based on the identification of input pattern, gameplay may be controlled to prevent or input actions from a player to prevent a particular action.

According to embodiments, process 200 may optionally include receiving gameplay training data at block 206 and also may optionally include generating and/or training a model at block 207. Receiving gameplay training data at block 206 can include receiving one or more of input controls, game actions and communications identified as negative behavior. At block 207, machine learning model may be generated and/or trained to receive player input controls and identify negative gaming behavior. Generating and training a machine learning model is described with reference to FIG. 4.

At block 215, process 200 includes determining at least one game function response of a game to limit outcome of the at least one player input control for the game. Depending on the negative game behavior, player input controls may be handled differently. By way of example, for negative gameplay considered to be toxic, a game function response may be to remove the player from the game session. Alternatively, player input controls considered negative may have one or more responses. According to embodiments, determining at least one game function response includes determining a warning message for output to the first player. By generating a warning, the player may reconsider behavior. In some instances, removal of a player and/or removing a players character from a game session may encumber other players. Accordingly, in certain embodiments, determination of a game function response may be selection of a limitation on player input controls. Determining at least one control for blocking in-game output of the player input control. For example, a player may have reduced control of a character for a period of time, such as lack of vehicle steering, delayed response, muted response to player controls and/or reduction in speed or abilities of a character. Alternatively, the player's character of gameplay elements may be controlled by the control device in the form of device controlled characters for a period of time. For example, a controller of a control device (e.g., console) can generate one or more bots to mirror or handle operations for a player.

According to embodiments, a game function response at block 215 can include generating a virtual gameplay session. For example, one or more characters of game elements controlled by a player with input controls determined to exhibit negative game play behavior can operate in a separate virtual game play session. The virtual gameplay session may be generating to determine how a player will continue to react. If negative actions continue, the player may be removed from a session. If the player actions are not determined to be negative the player can rejoin the session.

At block 220, process 200 can include controlling output of the game using the at least one game function response. Controlling output of the game can includes at least one of blocking and limiting input controls of the first player for a period of time. Controlling output of the game includes at least one of slowing and modifying game player characteristics of the first player for a period of time.

Process 200 may optionally include removing a player from the session at block 221. Controlling output of the game includes removing the first player from a game session for a period of time. Process 200 may optionally include generating a virtual session at block 221.

Figure 3:
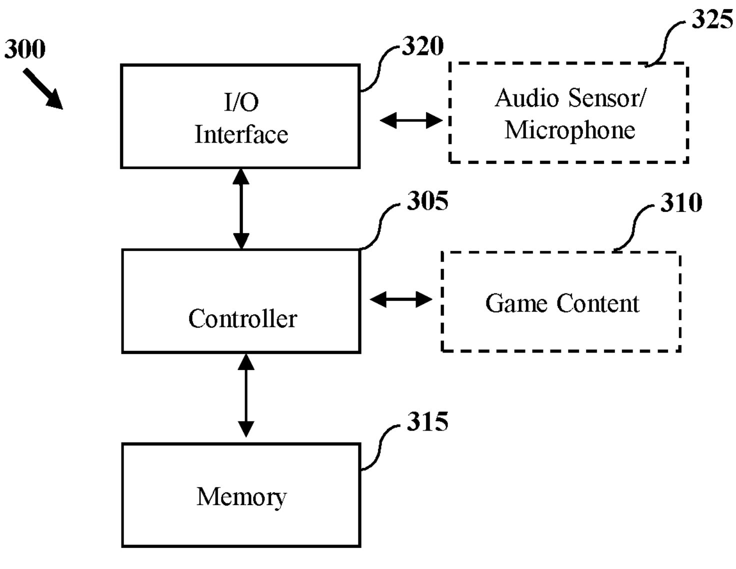
FIG. 3 illustrates a graphical representation of a device configuration according to one or more embodiments.

FIG. 3 illustrates a graphical representation of a device configuration according to one or more embodiments. Device 300 is configured for detecting negative gameplay behavior and gameplay control. Device 300 can provide one or more components and functions of a control device, such as control devices $\mathbf{105}_{1\text{-}n}$.

Device 300 may be a control device or game console device which can include controller 305, memory 315 and input/output (I/O) interface 320. Device 300 may represent one or more of a gaming console, computing device and electronic device in general configured to output one or more of video, audio and game data to an output device. Device 300 may also optionally include game content 310. Device 300 may also optionally include one or more audio sensors/microphones 325. Controller 305 may relate to a processor or control device configured to execute one or more operations stored in memory 315, such as processes for detecting gameplay behavior and gameplay control. Memory 315 may be non-transitory memory configured to provide data storage and working memory operations for device 300. Memory 315 may be configured to store computer readable instructions for execution by controller 305 for one or more processes described herein.

Figure 4:
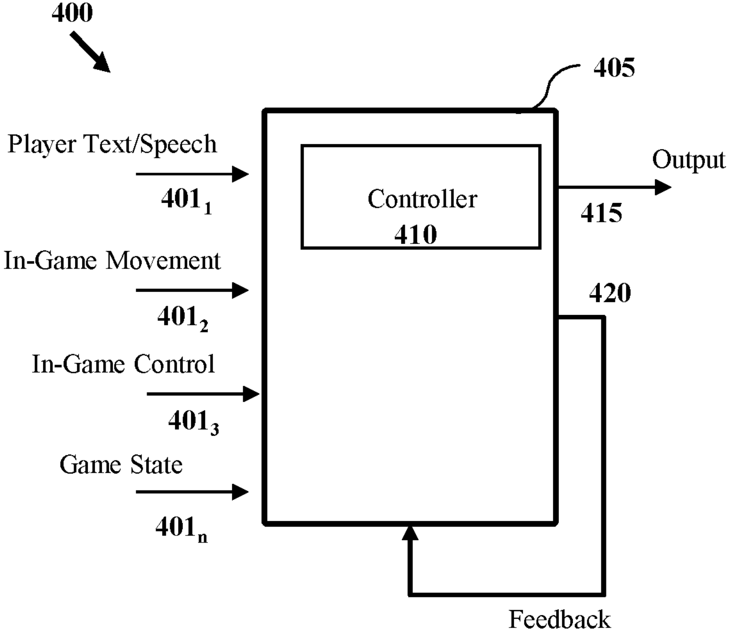
FIG. 4 illustrates a graphical representation of a process for training a model for negative gameplay behavior and gameplay control according to one or more embodiments.

Device 300 may be configured to receive gaming media (e.g., card, cartridge, disk, etc.) and output visual and audio content of the gaming media to an output device, such as a display. According to embodiments, game content 310 may include data for presentation of a game and may include data from one or more other gaming devices. According to embodiments, controller 305 is configured to receive gameplay data for a plurality of players for a game, which can include player input controls for the plurality of players. Gameplay data may be received by way of input/output (I/O) interface 320. Controller 305 may be configured to detect at least one negative game behavior for at least one player of the plurality of players based on at least one player input control for players, such as a first player. According to embodiments, controller 305 may be configured to determine at least one game function response of the game to limit outcome of the at least one player input control for the game. Controller 305 may control output of the game using the at least one game function response FIG. 4 illustrates a graphical representation of a process for training a model for negative gameplay behavior and gameplay control according to one or more embodiments. Training process 400 can include receiving training parameters $\mathbf{401}_{1\text{-}n}$ as training input by a device 405 including a controller 410. According to embodiments, controller 410 may receive a plurality of forms of player input controls and audio data samples as training input. In embodiments, training parameters $\mathbf{401}_{1\text{-}n}$ may include player text/speech, in-game movement, in-game control and game states. Player input controls may be labeled as examples of users actions for gaming content. Based on the training in process 400, controller 410 may generate output 415. Output 415 may include one or more game control parameters for filtering and/or control of a game session. According to embodiments, controller 410 may be configured to generate output 415 based on a recursive loop including training and feedback. Feedback loop 420 may provide information such as ratings and accuracy for output 415.

According to embodiments, training process 400 and controller 410 may be configured to use one or more learning models (e.g., artificial intelligence, iterative models, etc.) to detect and evaluate input controls. Training process 400 and controller 410 may use one or more libraries of player input control examples. According to embodiments, output 415 may include output of control signals identifying negative gameplay behavior.

According to embodiments, negative gameplay behavior identification and training may be to identify one or more of negative, unwanted, destructive, counterproductive, and unfriendly gameplay. Training by process 400 may provide a multi-model toxic behavior model based on multiple modalities of data text, speech, player in-game movement, player position in-game. The model can predict the likelihood of a toxic behavior including but not limited to a team kill, item/equipment trade fraud, and be used to warn players in vicinity based on patterns observed by the model. The model can be used to generate one or more warnings to players. The model may be used to auto-block toxic moves meant to harm players.

Figure 5:
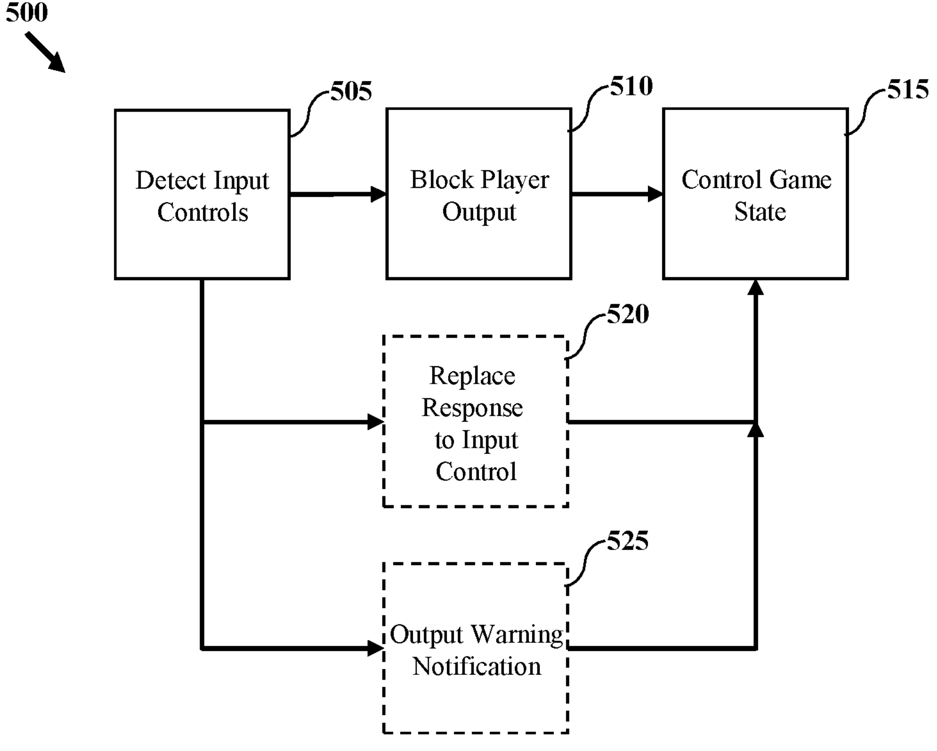
FIG. 5 illustrates a graphical representation of gameplay control according to one or more embodiments.

FIG. 5 illustrates a graphical representation of gameplay control according to one or more embodiments. According to embodiments a control device, which may be a console, gaming device or server, may detect input controls at block 505. Based on identification of negative gameplay, player output may be blocked at block 510. By way of example, a player providing input game controls to sabotage of harm another player during a game, the player input controls may be detected and a game state is controlled at block 515 such that the player input controls do not effect another player. According to embodiments, blocking player input controls may be to remove the effect of the player operations. Alternatively and/or in combination, blocking player input controls may be to reduce the effectiveness or blunt the controllability of a player, such as slowing down response time of a player controlled character.

Process 500 may optionally include replacing an input control response. By way of example, a user intended to sabotage or harm an another player by controlling the release of a implement may include a control device replacing the output of the implement with a different outcome. For example, striking with a hammer may be replaced with the first player losing the hammer. Process 500 may provide a warning notification to one or more players of a game session at optional block 525. The warning notification may include one or more of a sound, graphical display and warning message.

While this disclosure has been particularly shown and described with references to exemplary embodiments thereof, it will be understood by those skilled in the art that various changes in form and details may be made therein without departing from the scope of the claimed embodiments.

What is claimed is:

1. A method for detecting negative gameplay behavior and gameplay control, the method comprising:

receiving, by a device and during a gaming session, gameplay data for a plurality of players for a game, wherein the gameplay data includes player input controls for the plurality of players, wherein the player input controls comprise at least two of: game controller input, voice command, audio input, text input, player in-game movement, or player position in game;

detecting, by the device and during the gaming session and based on the gameplay data, at least one negative game behavior for at least one player of the plurality of players, wherein the at least one negative game behavior is detected based on at least two different player input controls for a first player;

determining, by the device and during the gaming session, at least one game function response of the game to limit an outcome of the at least two different player input controls for the first player; and controlling, by the device and during the gaming session, output of the game using the at least one game function response contemporaneously with the detection to auto-block negative moves by modifying or replacing at least one of the at least two different player input controls before a corresponding in-game action is performed.

2. The method of claim 1, wherein the negative game behavior is an in-game action of the first player for at least one of harming and disrupting a second player of the game.

3. The method of claim 1, wherein the negative game behavior is a communication from the first player to at least one second player of the game.

4. The method of claim 1, wherein the negative game behavior is detected using a model and model training on parameters for at least one of text, speech, player in-game movement, player position in-game, and game state.

5. The method of claim 1, wherein determining at least one game function response includes determining a warning message for output to the first player.

6. The method of claim 1, wherein determining at least one game function response includes determining at least one control for blocking in-game output of a player input control.

7. The method of claim 1, wherein controlling output of the game includes at least one of blocking and limiting input controls of the first player for a period of time.

8. The method of claim 1, wherein controlling output of the game includes at least one of slowing and modifying game player characteristics of the first player for a period of time.

9. The method of claim 1, wherein controlling output of the game includes removing the first player from a game session for a period of time.

10. The method of claim 1, wherein controlling output of the game comprises replacing a detected negative player input control with a non-harmful input control before execution of the corresponding in-game action.

11. A device configured for detecting negative gameplay behavior and gameplay control, the device comprising:

an interface;

a memory storing executable instructions; and a controller coupled to the interface and the memory, wherein the controller is configured to:

receive, during a gaming session, gameplay data for a plurality of players for a game, wherein the gameplay data includes player input controls for the plurality of players, wherein the player input controls comprise at least two of: game controller input, voice command, audio input, text input, player in-game movement, or player position in game;

detect, during the gaming session and based on the gameplay data, at least one negative game behavior for at least one player of the plurality of players, wherein the at least one negative game behavior is detected based on at least two different player input controls for a first player;

determine, during the gaming session, at least one game function response of the game to limit an outcome of the at least two different player input controls for the first player; and control, during the gaming session, output of the game using the at least one game function response contemporaneously with the detection to auto-block negative moves by modifying or replacing at least one of the at least two different player input controls before a corresponding in-game action is performed.

12. The device of claim 11, wherein the negative game behavior is an in-game action of the first player for at least one of harming and disrupting a second player of the game.

13. The device of claim 11, wherein the negative game behavior is a communication from the first player to at least one second player of the game.

14. The device of claim 11, wherein the negative game behavior is detected using a model and model training on parameters for at least one of text, speech, player in-game movement, player position in-game, and game state.

15. The device of claim 11, wherein determining at least one game function response includes determining a warning message for output to the first player.

16. The device of claim 11, wherein determining at least one game function response includes determining at least one control for blocking in-game output of a player input control.

17. The device of claim 11, wherein controlling output of the game includes at least one of blocking and limiting input controls of the first player for a period of time.

18. The device of claim 11, wherein controlling output of the game includes at least one of slowing and modifying game player characteristics of the first player for a period of time.

19. The device of claim 11, wherein controlling output of the game includes removing the first player from a game session for a period of time.

* * * * *